L. CHEW AND W. F. JENNINGS.
COMPRESSION PUMP.
APPLICATION FILED JUNE 9, 1922.

1,428,473.

Patented Sept. 5, 1922.
2 SHEETS—SHEET 1.

Inventors
Lewis Chew and
W. F. Jennings
by Wilkinson & Giusta
Attorneys.

L. CHEW AND W. F. JENNINGS.
COMPRESSION PUMP.
APPLICATION FILED JUNE 9, 1922.

1,428,473.

Patented Sept. 5, 1922.
2 SHEETS—SHEET 2.

Inventors
Lewis Chew and
W. F. Jennings
by Wilkinson & Fisola
Attorneys.

Patented Sept. 5, 1922.

1,428,473

UNITED STATES PATENT OFFICE.

LEUIG CHEW AND WILLIAM FREDERICK JENNINGS, OF LONDON, ENGLAND.

COMPRESSION PUMP.

Application filed June 9, 1922. Serial No. 567,163.

*To all whom it may concern:*

Be it known that we, LEUIG CHEW and WILLIAM FREDERICK JENNINGS, subjects of the King of Great Britain, and residents of London, England, have invented certain new and useful Improvements in Compression Pumps, of which the following is a specification.

This invention relates to compression pumps and particularly to that class of compressors as employed in connection with refrigerating apparatus.

With the enclosed type of compressor such as is commonly in use for compressing the volatile gas or refrigerant in such machines, there has always been difficulty in preventing the oil which is carried in the crank case for lubricating the bearings from being carried over into the pipe-system thereby materially interfering with the efficiency of the machine as a whole by collecting in some of the various pockets formed by the pipe connections to or from the condenser or evaporator coils or otherwise.

Now with high speed machines and in the case of the use of carbonic anhydride it is impossible to provide sight glasses in the crank case to observe what is happening although with anhydrous ammonia this is possible and at any time inadvertently the lubricating effect may fail due to shortage of oil or lubricant in the crank case.

The improvements which form the subject matter of the present invention are designed with a view to promote efficient lubrication of all the working parts by the avoidance of pockets as aforesaid and by allowing the lubricant to be forced by the action of the compressor itself completely round the cycle with the refrigerant and providing means whereby the oil is automatically separated from the gas within the crank casing and distributed throughout the bearings of the machine.

With the modern practice of producing an increased velocity of the gases passing we have found it practicable to obtain a very efficient forced lubricating effect by the action of the compressor pistons, the underside of which are open to the crank casing by permitting the circulation of the oil throughout the system and the separation of the oil from the gas on its return to the crank casing.

For this purpose, given a complete charge of the gas and oil in a refrigerating plant of the kind referred to the fulfilment of the above object can be effected by leading the return or suction gas and the oil mixed with it from the evaporator side of the machine back to an annular chamber provided within the stuffing box at the end of the crank shaft, thereby lubricating the gland.

From this annular chamber the gas together with its oil contents is conveyed through a hole drilled throughout the crank shaft wherein are provided transverse holes or passages leading to the respective bearings to be lubricated the hole through the crankshaft being of ample size to form the main induction passage. These transverse holes are so disposed that by centrifugal force there is a tendency for the oil held in suspension in the gas to become separated therefrom and pass out of the ends of the said holes or passages which communicate with the ordinary oil ways formed in the bearings.

The connecting rods are likewise made hollow for the purpose of supplying oil to the cross head wrist pins. The gas deprived in this manner of the greater part of its oil content is free to pass on through the hollow crank shaft and escapes into the crank casing from whence it finds its way into the interior of the hollow piston or pistons and thence to the suction valve or valves of the compressor.

From the foregoing description it will be understood that according to our invention the return or suction from the evaporator is led back into the hollow crank shaft which forms the main induction passage wherein the oil is separated therefrom by centrifugal force and automatically distributed on to the bearings and working parts of the machine and it will be obvious that the details of construction for the fulfilment of these conditions must necessarily vary to suit the attending circumstances dictated by the refrigerant employed and the type of machine to which it is desired to apply the said improvements.

In order that our invention may be clearly understood reference may now be had to the accompanying sheet of drawings in which:—

Similar letters of reference relate to like parts in all the figures of the drawing.

Figures 1, 2:
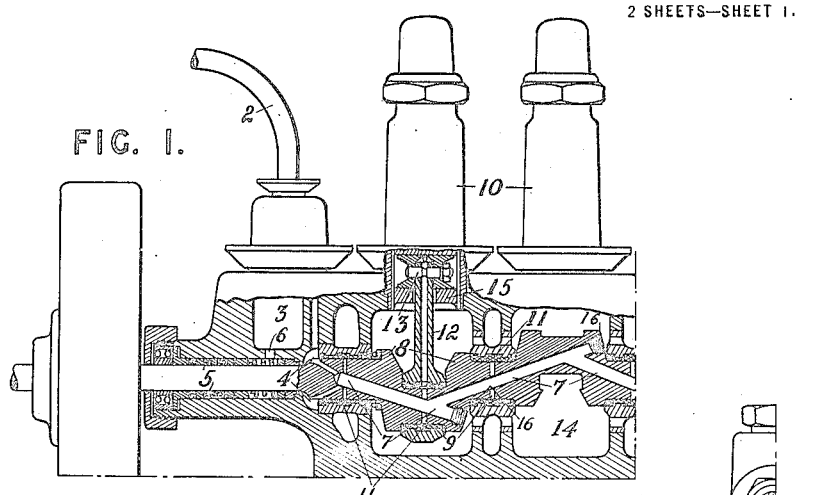
Figure 1 is a partial sectional elevation of a single acting multi-cylinder vertical type of compressor of the kind referred to with our improvements applied thereto.
Figure 2 illustrates in two parts (left and right of the centre line) an elevation of a modified form of compressor with the cylinders disposed horizontally in tandem fashion on either side of the crank casing with the end cover removed.

Referring now to Figure 1, which illustrates our invention applied to the ordinary vertical multi-cylinder enclosed type of compressor, it will be observed that the return or suction gas and the oil mixed with it from the evaporator side of the machine is led back by the pipe 2 to the chamber 3 which communicates with the annular chamber 4 provided at the end of the stuffing box 5 a part of the oil finding its way into the interior of the stuffing box 5 through the orifice 6.

From the annular chamber 4 the gas, together with its oil contents, is conveyed through the holes 7 drilled throughout the crank shaft 8 which is provided with transverse holes or passages 9 that lead to the respective bearings to be lubricated. The main bore 7 of the crank shaft 8 is of sufficient size to form the main induction passage for the supply of gas to the cylinders 10.

These transverse holes 9 are so disposed that by centrifugal force there is a tendency for the oil held in suspension in the gas to become separated therefrom and pass out of the ends of said holes or passages which communicate with the ordinary oil ways formed in the bearings 11.

The connecting rods 12 are likewise made hollow for the purpose of supplying oil to the cross head wrist pins 13. The gas deprived in this manner of the greater part of its oil contents is free to pass on through the hollow crank shaft 8 and escape into the crank casing 14 from whence it finds its way into the interior of the hollow piston or pistons 15 and thence to the suction valve or valves in the top thereof.

It will be observed that the gas coming from the evaporator will find its way into the crank casing 14 by traversing the induction passage 7 and escaping through the open end or ends 16 thereof. Generally we have found that only one of these ends 16 need be open and that at the far end away from the stuffing box the others being preferably closed by plugs in the ordinary way, the gas thereby travels the entire length of the crank shaft.

Obviously, however, when many cylinders are used it may be desirable to have more than the one outlet for the gas to ensure an efficient supply to the several cylinders.

Figure 4:
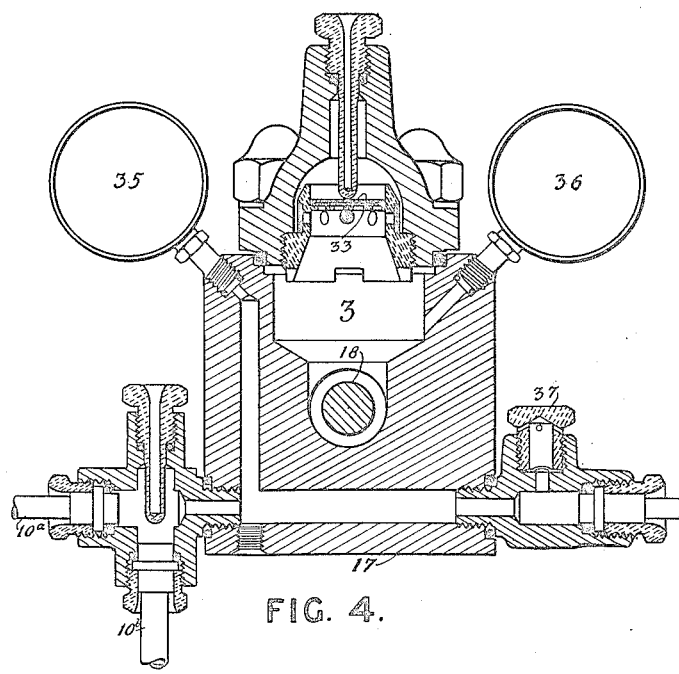
Figure 4 is a transverse sectional elevation taken on the line x—x of Figure 3.
Figure 3:
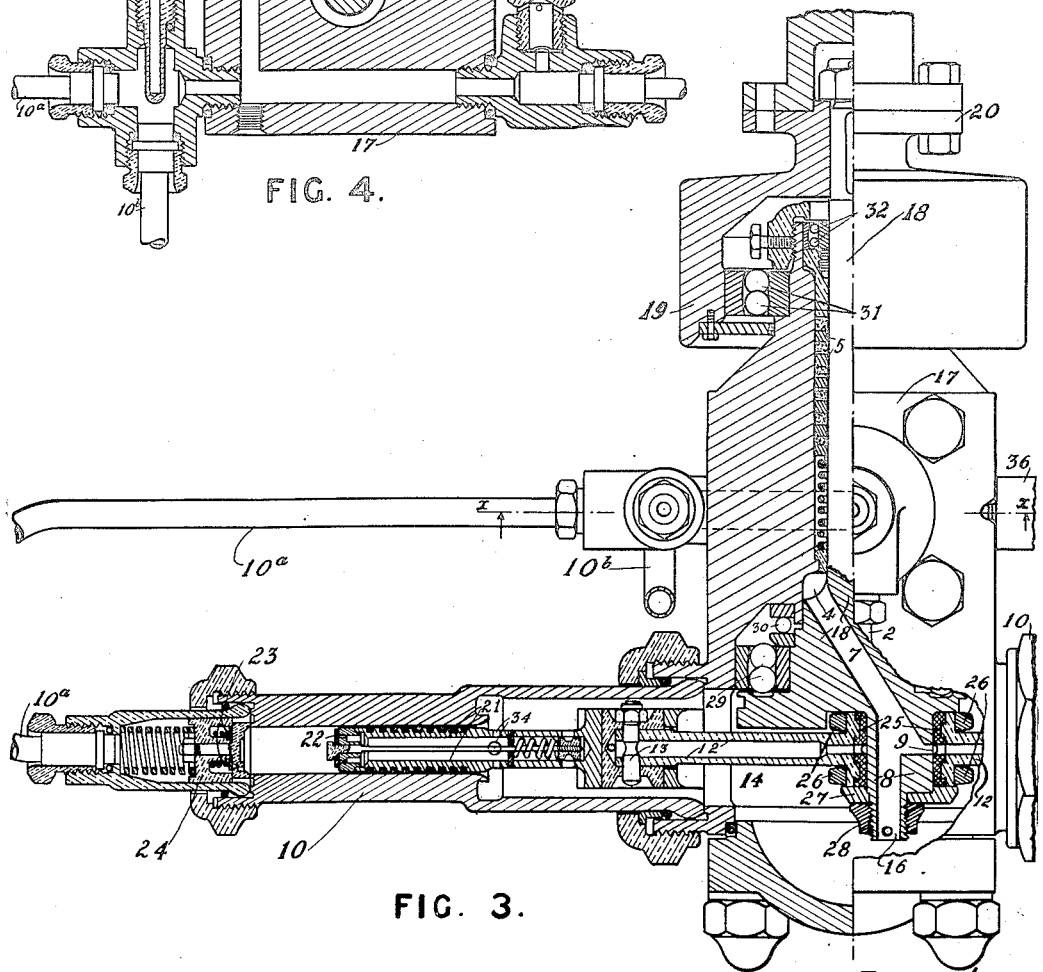
Figure 3 is a sectional plan of the left-hand half of Figure 2.

By the adoption of the above improvements and especially by leading the return gas from the evaporator into the chamber adjacent to the stuffing box and thence into the hollow crank shaft we have found that it is possible to materially increase the speed of such compressors, and with a view to satisfying particulary small requirements of users we have incorporated the said improvements in a preferred form of construction of machine as illustrated in Figures 2-4 to which reference may now be made.

This machine comprises a block 17 that serves as the crank casing 14 and supports the driving shaft 18 that is embraced by the stuffing box 5 and serves to support the driving pulley or fly wheel 19 which may be coupled directly to an electric motor or other motive power by the coupling 20, the compressor however may be driven by any other motive power or by belt. To the block 17 is attached as shown the compressor cylinders 10 that are situated in alignment with one another the shaft 18 being provided with a disc crank 8 on which is mounted the two connecting rods 12 that communicate motion to the pistons 21. The suction valves 22 in the heads of the pistons 21 are preferably of the well known ring type construction and the delivery valves 23 mounted in the yielding heads 24 at the head of the cylinders 10 are preferably of a similar character but obviously any other type of both suction and delivery valves may be employed.

In order to drive the two compressors which are disposed in tandem fashion in alignment with one another the respective connecting rods that are mounted on the crank pin 8 each carry segmental bearings 25 that are held together by the pair of rings 26 the said rings being retained in situ by the washer plate 27 and the nut 28, which latter is secured to the end of the crank pin 8.

It will be observed that the shaft 18 by which the pair of compressors are driven is supported by ball bearings 29 at the crank end and a thrust ball bearing 30 is provided at that end of the casing. The fly wheel 19 is also mounted on a ball bearing 31 which is fitted to the outside of the block 17 whereby undue strain is taken off the shaft 18 which is also supported within the block 17 by the ball bearing 32. With this arrangement friction is reduced to a minimum and consequently the speed of the compressor can be materially increased.

The return gas or suction from the evaporator as in the previous example is brought into the chamber 3 by the conduit 2 whence it finds its way through the strainer 33 into the annular chamber 4 that is in direct communication with the induction passage 7 with which communicates the oil way 9 that distributes the oil firstly on to the main bearings 25 and thence through the hollow connecting rods 12 to the wrist pins 13. The gas escapes at the open end 16 of the crankpin 8 into the chamber 14 whence it finds its way into the interior of the pistons 21 by the passages 34 to the suction valves 22.

10ª is the delivery pipe from the left hand cylinder and 10ᵇ that connected up to the right hand cylinder 10 which may be coupled up for example as shown in Figure 4 which likewise illustrates the application of the necessary gauges 35 and 36 and safety valve 37 as commonly employed in carbonic anhydride compressors.

What we claim is:—

1. In a compressor of the kind employed for refrigerating purposes, the combination of cylinders, pistons therein, a crank case communicating with the cylinders, bearings in the crank case, a crank shaft journaled in said bearings and having an induction passage extending therethrough and opening into the crank case, connecting rods coupled to the crank shaft for driving said pistons, said crank shaft having transverse holes leading from the induction passage to the bearings, a stuffing box for the crank shaft at one end of the crank case, a chamber in communication with said stuffing box and in connection with a source of gas and oil supply from the evaporator side of the refrigerating machine, and an annular chamber communicating with the stuffing box and the first mentioned chamber and also being in connection with the induction passage in said crank shaft, substantially as described.

2. A compression pump comprising a block having an enclosed case, a crank shaft journaled in the block and provided with a crank pin extending into the case, said crank pin having a passage opening into the casing and provided with transverse ports, cylinders disposed in axial alignment communicating with the case, pistons in the cylinders, connecting rods having a bearing upon the crank pin and coupled to drive said pistons, the connecting rod bearings receiving lubricant through the passage and transverse ports of the crank pin, a stuffing box in the block for the shaft, a source of commingled gas and oil supply in communication with the stuffing box, and with the passage in said crank pin whereby oil may be supplied to the bearings and gas to the cylinders, substantially as described.

3. A compression pump comprising a metallic block having a crank case therein, a pair of cylinders disposed in axial alignment and communication with opposite sides of the crank case and being secured to said block, pistons reciprocating in the cylinders, a shaft journaled in said block and having a crank pin extending into said crank case, said crank pin having a passage therethrough opening into the crank case and provided with transverse ports, connecting rods for reciprocating the pistons having a bearing upon said crank pin and lubricated through the ports thereof, ball bearings to support the inner end of the shaft in the crank case, thrust bearings adjacent said first named bearings, said crank case having an annular chamber adjacent said bearings, a stuffing box for the shaft adjacent said annular chamber, a source of gas and oil supply in communication with the stuffing box and said annular chamber, a fly wheel upon the exterior of the block connected to said crank shaft, and ball bearings for the fly wheel also on the exterior of the block, substantially as described.

In testimony whereof we affix our signatures.

LEUIG CHEW.
WILLIAM FREDERICK JENNINGS.